(No Model.)
A. L. GRIFFITH.
SEED AND FERTILIZER DISTRIBUTER.
No. 556,671. Patented Mar. 17, 1896.
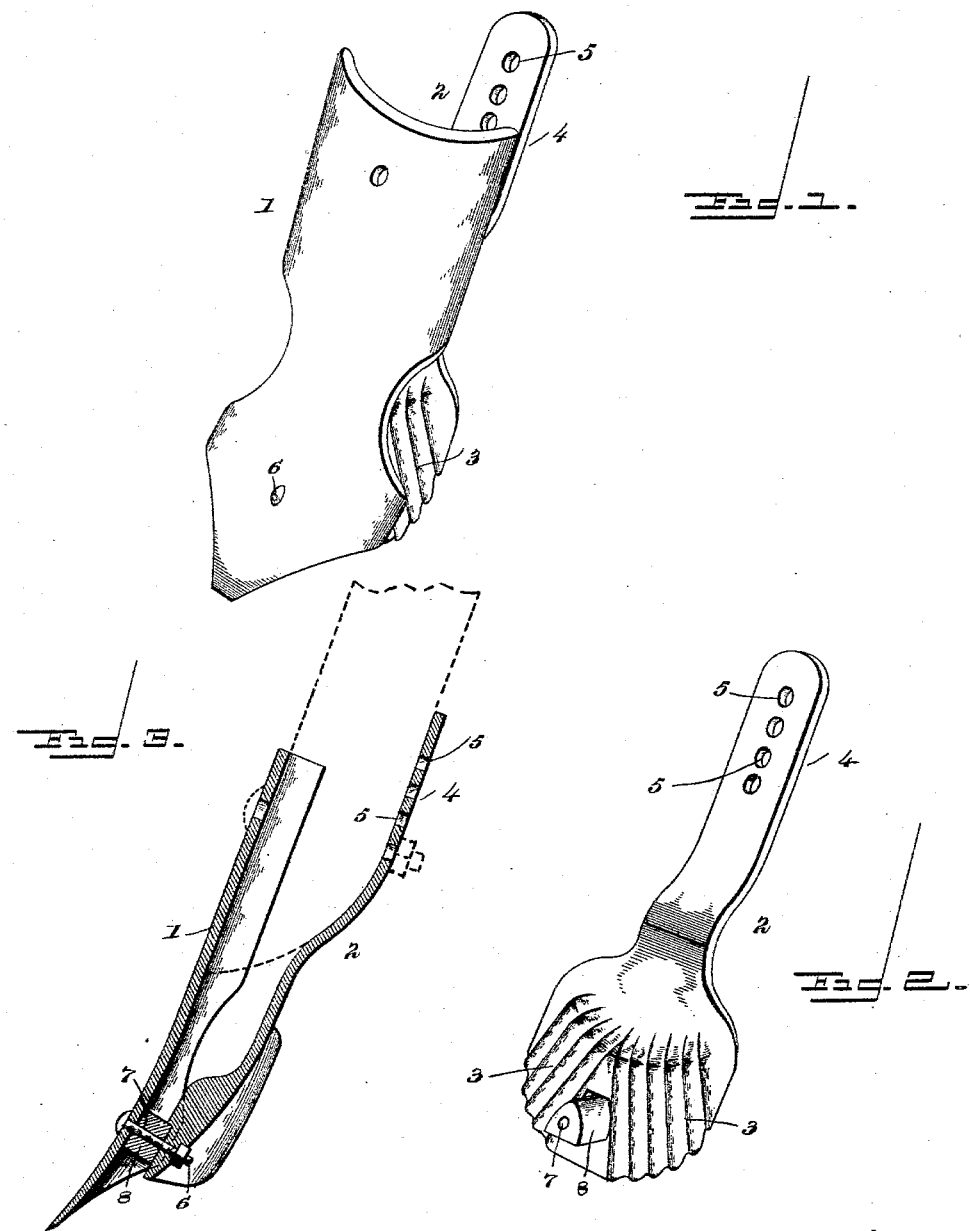
Witnesses
Inventor
Alexander L. Griffith
By his Attorneys,

UNITED STATES PATENT OFFICE.

ALEXANDER L. GRIFFITH, OF COLUMBUS, OHIO.

SEED AND FERTILIZER DISTRIBUTER.

SPECIFICATION forming part of Letters Patent No. 556,671, dated March 17, 1896.

Application filed October 26, 1894. Serial No. 527,040. (No model.)

*To all whom it may concern:*

Be it known that I, ALEXANDER L. GRIFFITH, a citizen of the United States, residing at Columbus, in the county of Franklin and State of Ohio, have invented a new and useful Seed and Fertilizer Distributer, of which the following is a specification.

My invention relates to a seed and fertilizer distributer adapted for use in connection with a grain seeder or planter, and the objects in view are to provide a simple, inexpensive, and efficient attachment adapted for use in connection with a listing or other furrow-opening plow and designed to distribute the seed and fertilizing material, whereby they are brought into intimate contact with each other and with the soil, whereby a larger proportion of the seed is rendered fruitful.

Further objects and advantages of my invention will appear in the following description, and the novel features thereof will be particularly pointed out in the claim.

In the drawings, Figure 1 is a perspective view of a distributing attachment embodying my invention applied in the operative position to a furrow-opening plow. Fig. 2 is a detail view, in perspective, of the distributer. Fig. 3 is a vertical central sectional view of the distributer applied in the operative position to a shovel with the interposed spacing-block, the standard being illustrated in dotted lines.

Similar numerals of reference indicate corresponding parts in all the figures of the drawings.

1 designates a furrow-opening shovel, which is preferably constructed with a broader blade than is usual in the art, the cutting-edges being disposed approximately at right angles to each other, whereby a broader furrow than usual is formed, and 2 represents the attachment for distributing the seed and fertilizing material, the same being concavo-convex in horizontal section and being provided upon its front surface with a series of downwardly-deflected grooves or channels 3. The convexed front surface of the distributer corresponds approximately in contour with the rear concaved surface of the furrow-opening shovel, and the lower edge thereof is arranged above the plane of the point of the shovel, whereby the distributer travels in the furrow, but out of contact with the soil. The distributer-blade is provided with a shank 4, provided with means for attachment to the standard which supports the shovel, and said shank is provided with a plurality of bolt-openings 5, whereby one of them may be in position to receive a bolt extending through an opening in the shovel, irrespective of the length of said shovel.

By the construction as described the grain and fertilizer which are deposited upon the front grooved or channeled surface of the distributer are carried by the grooves or channels to the lower edge of the blade, and as said grooves or channels are deflected toward the lower edges of the blade the seed and fertilizing material are distributed over a broader surface than usual in machines of the class to which this invention appertains, and therefore said seed and fertilizing material are more intimately commingled and a greater portion of the seed is brought into contact with the soil and is in position to become fruitful.

The blade of the distributer is secured to the furrow-opening shovel by means of a bolt 6, and interposed between said blade and the shovel, and perforated, as shown at 7, for the reception of the bolt, is a spacing-block 8, which is wedge-shaped in section, being tapered toward its upper edge to prevent the lodgment of fertilizer or seed and assist in the distribution thereof.

It will be understood that in practice various changes in the form, proportion, and the minor details of construction may be resorted to without departing from the principle or sacrificing any of the advantages of this invention.

Having thus described my invention, what I claim is—

The combination with a furrow-opening shovel, of a forwardly-convexed distributer arranged in rear of said shovel and provided with downwardly-divergent grooves or channels for conducting seed and fertilizing material, a spacing-block interposed between the distributer-blade and the rear side of the shovel and tapered toward its upper edge, and a bolt connecting the distributer-blade and the shovel and extending through said spacing-block, substantially as specified.

In testimony that I claim the foregoing as my own I have hereto affixed my signature in the presence of two witnesses.

ALEXANDER L. GRIFFITH.

Witnesses:
F. S. TURNER,
WILL. H. TURNER.